United States Patent
Toda et al.

(10) Patent No.: US 8,741,193 B2
(45) Date of Patent: Jun. 3, 2014

(54) INJECTION MOLDING METHOD, MOLDED-ARTICLE PRODUCING METHOD, AND INJECTION MOLDING APPARATUS

(75) Inventors: Naoki Toda, Nagoya (JP); Satoshi Imaeda, Nagoya (JP); Toshihiko Kariya, Nagoya (JP); Takeshi Yamaguchi, Nagoya (JP)

(73) Assignee: Mitsubishi Heavy Industries Plastic Technology Co., Ltd., Nagoya-shi (JP)

( * ) Notice: Subject to any disclaimer, the term of this patent is extended or adjusted under 35 U.S.C. 154(b) by 61 days.

(21) Appl. No.: 13/512,272

(22) PCT Filed: Mar. 18, 2010

(86) PCT No.: PCT/JP2010/001954
§ 371 (c)(1),
(2), (4) Date: May 25, 2012

(87) PCT Pub. No.: WO2011/114378
PCT Pub. Date: Sep. 22, 2011

(65) Prior Publication Data
US 2012/0286451 A1    Nov. 15, 2012

(51) Int. Cl.
*B29C 45/73*    (2006.01)

(52) U.S. Cl.
USPC .............. 264/40.6; 264/328.16; 425/144; 425/547

(58) Field of Classification Search
USPC ............ 264/40.6, 328.16; 425/144, 547, 552
See application file for complete search history.

(56) References Cited

U.S. PATENT DOCUMENTS

| | | | | |
|---|---|---|---|---|
| 4,340,551 A | * | 7/1982 | Wada et al. | 264/403 |
| 5,062,786 A | * | 11/1991 | Arai | 425/174 |
| 5,591,385 A | * | 1/1997 | Arai et al. | 264/40.6 |
| 6,203,731 B1 | | 3/2001 | Kato et al. | |
| 2003/0141609 A1 | * | 7/2003 | Jia | 264/39 |
| 2008/0093764 A1 | * | 4/2008 | Ito et al. | 264/101 |
| 2012/0032365 A1 | * | 2/2012 | Sun et al. | 264/328.16 |

FOREIGN PATENT DOCUMENTS

| | | |
|---|---|---|
| JP | 11-115013 A | 4/1999 |
| JP | 11-291300 A | 10/1999 |
| JP | 2006-110905 A | 4/2006 |
| JP | 2007-083653 A | 4/2007 |
| JP | 2009-006486 A | 1/2009 |

OTHER PUBLICATIONS

International Search Report of PCT/JP2010/001954, mailing date May 18, 2010, with English translation.
Written Opinion of PCT/JP2010/001954, mailing date May 18, 2010, with English translation.

* cited by examiner

*Primary Examiner* — Jill Heitbrink
(74) *Attorney, Agent, or Firm* — Westerman, Hattori, Daniels & Adrian, LLP

(57) ABSTRACT

The injection molding method for injecting a resin into a cavity formed within a mold is provided with a heating step in which the temperature of a cavity surface forming the cavity of the mold is heated to a temperature equal to or higher than a heat distortion temperature of the resin and an injection step in which after the heating step, during a decrease in temperature of the cavity surface of the mold, the resin is injected into the cavity.

10 Claims, 4 Drawing Sheets

INJECTION MOLDING METHOD, MOLDED-ARTICLE PRODUCING METHOD, AND INJECTION MOLDING APPARATUS

TECHNICAL FIELD

The present invention relates to an injection molding method, a molded-article producing method, and an injection molding apparatus.

BACKGROUND ART

Conventionally, there have been considered various molding methods for transferring a configuration of the cavity surface of a mold to a resin with high accuracy, thereby improving the external appearance of a molded article on injection molding of the resin within the mold. For example, in the plastic injection molding method (an injection molding method) disclosed in Patent Document 1, the temperature of mold during injection molding is controlled based on the glass transition temperature of a resin where a resin material is non-crystalline, while the temperature of mold is controlled based on the melting point of a resin where a resin material is crystalline.

More specifically, a mold surface (cavity surface) in contact with a molded article is heated at a temperature rising speed of 2 (° C./s) (2° C. per second) or higher to the glass transition temperature of the resin where the resin material is non-crystalline and to a predetermined temperature equal to or higher than the melting point of the resin where the resin material is crystalline. Then, while the temperature of the mold surface is kept at the predetermined temperature, the resin is filled into a cavity of a mold. Further, after the resin has been filled, the mold surface is cooled at a temperature falling speed of 2 (° C./s) or higher.

The mold is controlled for temperature in the manner described above, by which the resin is decreased in temperature to a lesser extent than conventionally when the resin is in contact with the mold, thus improving transfer properties of the resin. Further, since the resin is also decreased in viscosity, the resin surface which is in contact with the mold surface can be easily distorted, thus making it possible to reduce the inner pressure of the resin necessary for the transfer with pressure.

PRIOR ART DOCUMENT

Patent Document

Patent Document 1: Japanese Published Unexamined Patent Application No. H11-115013

SUMMARY OF THE INVENTION

Problems to be Solved by the Invention

However, in the plastic injection molding method disclosed in Patent Document 1, the resin is injected into the cavity, while the mold surface is maintained at a predetermined temperature. Therefore, the resin is maintained at a high temperature greater than the heat distortion temperature for such a long period of time that sink marks can easily develop on a molded article. On the other hand, an increased pressure in a pressure retaining step and a longer pressure-retaining period of time are effective in suppressing the formation of sink marks. This may, however, bring about the possibility of the formation of developing burrs.

Further, during heating of a mold, a large amount of heat is supplied to the mold to rapidly heat the mold which is large in heat capacity, by which the mold heated to a temperature higher than the above-described predetermined temperature. Thus, the injected resin is in contact with the mold surface which has been brought closer to a resin melting temperature by the overshooting, and thereby the resin is decreased in temperature to a lesser extent by contact with the mold. A lesser extent of decrease in resin temperature allows the resin to maintain a highly fluid state which is lower in viscosity, such that the resin may enter into a space between molds which may cause burrs on a molded article.

The present invention has been made in view of the above problems, and an object of which is to provide an injection molding method capable of suppressing the formation of sink marks and burrs on a molded article, a molded-article producing method, and an injection molding apparatus.

Means for Solving the Problems

The injection molding method of the present invention is an injection molding method for injecting a thermoplastic resin into a cavity formed within a mold. This injection molding method is provided with a heating step in which the temperature of a cavity surface which forms the cavity of the mold is heated to a temperature equal to or higher than the heat distortion temperature of the resin and an injection step in which after the heating step, during a decrease in the temperature of the cavity surface of the mold, the resin is injected into the cavity.

Further, the molded-article producing method of the present invention is a molded-article producing method for injecting a resin into a cavity formed within a mold to produce a molded article. The molded-article producing method is provided with a heating step in which the temperature of a cavity surface which forms the cavity of the mold is heated to a temperature equal to or higher than the heat distortion temperature of the resin and an injection step in which after the heating step, during a decrease in the temperature of the cavity surface of the mold, the resin is injected into the cavity.

According to the present invention, in the injection step, the resin is injected into the cavity while the temperature of the cavity surface of the mold is decreased in temperature. Therefore, as compared with a conventional case where injection is carried out in a state when the temperature of the cavity surface is largely in excess of the lowest temperature lower limit at which high transfer properties can be obtained by the overshooting, a resin is injected in a state when the temperature of the cavity surface is low (for example, the temperature close to the lowest temperature, that is, a predetermined temperature which is higher by several tens of degrees than the heat distortion temperature, at which the high transfer properties can be obtained). Thus, the time in which the resin in contact with the cavity surface is maintained at a high-temperature region where the resin contraction advances, that is, a temperature equal to or higher than the heat distortion temperature is decreased. It is, therefore, possible to suppress the formation of sink marks on a molded article.

Further, during a decrease in temperature of the cavity surface, the resin is injected into the cavity. Therefore, as compared with a conventional case where the resin is injected in a state when the temperature of the cavity surface is largely in excess of the lowest temperature at which the high transfer properties can be obtained by the overshooting, the resin in contact with the cavity surface is decreased in temperature. Therefore, the resin in contact with the cavity surface is decreased in temperature at an earlier stage to increase the viscosity of the resin, thereby making it possible to suppress the formation of burrs on a molded article.

Still further, in the above-described injection molding method, it is preferable that in the injection step, the resin is injected into the cavity when the temperature of the cavity surface of the mold reaches a predetermined temperature equal to or higher than the heat distortion temperature of the resin.

According to the present invention, when the resin which has melted at a temperature higher than the heat distortion temperature reaches a predetermined temperature equal to or higher than the heat distortion temperature after the mold starts to decrease in post-overshooting temperature due to heat releasing or cooling effects, the resin is injected. Therefore, during a decrease in temperature of the mold, the resin which maintains fluidity at a temperature close to the lowest temperature at which the high transfer properties can be obtained is brought into contact with the cavity surface of the mold. It is, thereby, possible to reliably transfer a configuration of the cavity surface of the mold to the resin and also prevent the formation of sink marks and burrs on a molded article. Where a region which needs the high transfer properties is a part of the cavity surface, only that part may be heated to a temperature equal to or higher than the heat distortion temperature.

Further, in the above-described injection molding method, it is preferable that in the injection step, the temperature of the cavity surface at the time when the resin is in contact with the entire cavity surface of the mold is set so as to be equal to or higher than the heat distortion temperature of the resin.

According to the present invention, immediately after the resin melted at a temperature higher than the heat distortion temperature is in contact with the cavity surface, the temperature of the resin is a temperature equal to or higher than the heat distortion temperature. Thus, the resin which maintains fluidity can be brought into contact with the cavity surface of the mold, thereby reliably transferring a configuration of the entire cavity surface to the resin. It is, thereby, possible to improve the entire external appearance of a molded article and also to prevent the formation of sink marks and burrs on the molded article over the entire surface thereof.

Further, in the above-described injection molding method, where the resin contains, for example, a fibrous filler which is a reinforced fiber, it is preferable that the above heat distortion temperature thereof is set to be the heat distortion temperature of the resin which is a matrix component.

According to the present invention, on the surface of a molded article which is a contact surface between the molded article and the mold, the distortion property and fluidity of the resin which covers the surface of the fibrous filler are based on the heat distortion temperature of the resin itself which is in general lower than the heat distortion temperature of the fibrous filler-containing state of resin. Therefore, a heating target temperature of the mold can be set lower, thereby reducing the mold heating heat capacity as well. It is more preferable that the above-described heat distortion temperature is equal to or higher than the heat distortion temperature of the resin which is a matrix component. It is also preferable that the above-described heat distortion temperature is equal to or higher than the heat distortion temperature of a resin material containing the fibrous filler. In this instance, heating is conducted to a temperature equal to or higher than the heat distortion temperature of the filler-containing state of resin, by which even a molded article which is made from the filler containing resin and is difficult to distort can be distorted easily. It is also possible to reduce the stress and strain on the molded article.

Further, in the above-described injection molding method, it is more preferable that in the injection step, after the resin is in contact with the entire cavity surface of the mold, the cooling speed of the cavity surface is increased.

According to the present invention, it is possible to reliably transfer a configuration of the entire cavity surface to the resin and shorten the time necessary for producing a molded article.

Further, in the above-described injection molding method, it is more preferable that in the injection step, the cooling speed of the cavity surface of the mold is set at 1.0 (° C./s) or higher.

According to the present invention, the mold with which the resin is in contact is rapidly decreased in temperature, thus making it possible to shorten the time during which the resin is at a temperature equal to or higher than the heat distortion temperature and also to prevent the resin from attaching firmly to the cavity surface.

Further, in the above-described injection molding method, it is more preferable that the temperature of the cavity of the mold is measured at a plurality of sites, after the heating step, and, the resin is injected into the cavity after any one of the following temperature measurement values start to decrease: any one of temperature measurement values at the plurality of sites, a limited number of all the temperature measurement values selected from the temperature measurement values at the plurality of sites, or all the temperature measurement values at the plurality of sites.

Further, in the above-described injection molding method, it is more preferable that the temperature of the cavity of the mold is measured at a plurality of sites, after the heating step, and, the resin is injected into the cavity after an average of any one of the following temperature measurement values start to decrease: a limited number of all the temperature measurement values selected from the temperature measurement values at the plurality of sites, or all the temperature measurement values at the plurality of sites.

Still further, in the above-described injection molding method, it is more preferable that the temperature of the cavity surface of the mold is measured so as to correspond to elapsed time, thereby calculating the temperature rising gradient value of the cavity surface with respect to time, and when the temperature rising gradient value is equal to or lower than a predetermined value, or when time is up by a timer set to start at the time when the temperature rising gradient value is equal to or lower than the predetermined value, injection is started.

In addition, the injection molding apparatus of the present invention is provided with a mold which has a cavity formed therein and which can be opened and closed, an injector which injects a resin into the mold, a temperature adjustor which is able to adjust the temperature of the mold to a predetermined temperature, a temperature sensor which measures the temperature of a cavity surface that forms the cavity of the mold, and a controller which has a timer for measuring a predetermined time and controls the injector and the temperature adjustor on the basis of the temperature of the temperature sensor. In the controller, the temperature adjustor is used to heat the mold so that the temperature of the temperature sensor is equal to or higher than the heat distortion temperature of the resin, and the injector is used to inject the resin into the cavity, when the timer detects that a predetermined time necessary for the temperature sensor to start to decrease in temperature and reach a predetermined temperature has elapsed from the start of a decrease in temperature of the temperature sensor after heating of the mold or when the temperature sensor determines that the predetermined time has elapsed.

In general, a temperature sensor will stably decrease in temperature with respect to elapsed time since the temperature sensor starts to decrease in temperature after a mold has been heated. Thus, for example, a preliminary test, and so on, is conducted in advance, by which there is obtained a relational expression between the elapsed time and the temperature of the temperature sensor. Then, the elapsed time corresponding to a temperature at which a resin is injected is calculated from the measurement-based relational expression and set so that a timer sends a signal to a controller at the elapsed time.

The above setting makes it possible to detect a timing at which the resin is injected by an injector not by referring to the temperature of the temperature sensor but by the time measured by the timer.

Further, the resin may be injected into the cavity by the injector when the controller allows the temperature adjustor to heat the mold so that the temperature of the temperature sensor is equal to or higher than the heat distortion temperature of the resin and the controller detects, without using the timer, reaching the temperature sensor at a predetermined temperature after the start of a decrease in temperature.

Advantageous Effect of the Invention

According to the injection molding method, the molded-article producing method and the injection molding apparatus of the present invention, it is possible to suppress the formation of sink marks and burrs on a molded article.

MODE FOR CARRYING OUT THE INVENTION

First Embodiment

Hereinafter, a description will be given of the first embodiment of the injection molding apparatus of the present invention with reference to FIG. 1 to FIG. 4.

Figure 1:
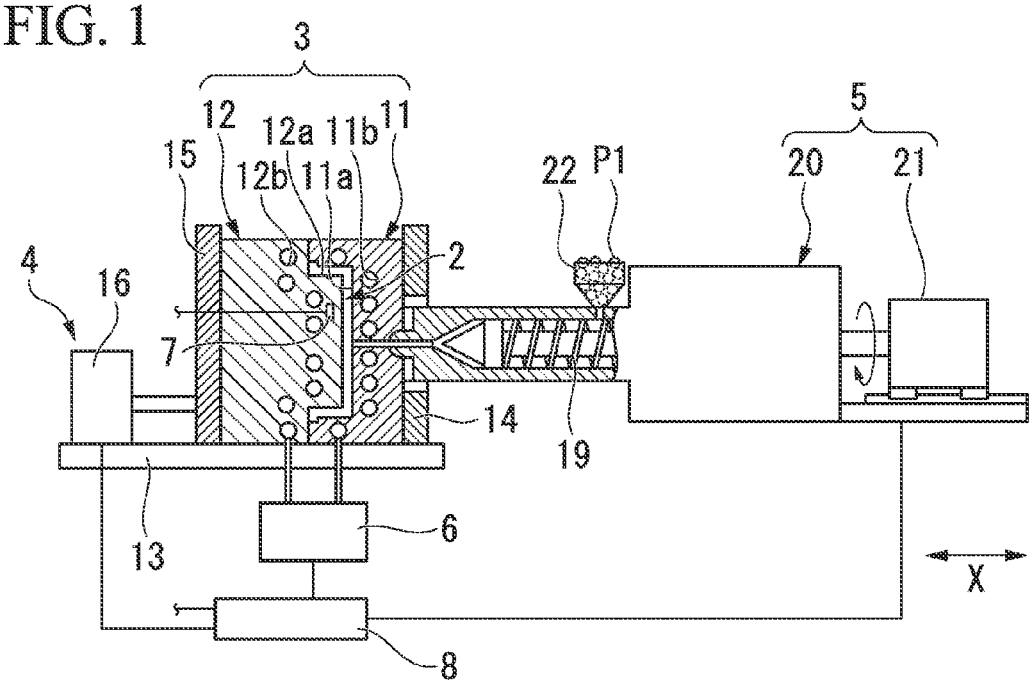
FIG. 1 is a partially broken side view which shows an injection molding apparatus of a first embodiment of the present invention.

As shown in FIG. 1, an injection molding apparatus 1 of the present embodiment is provided with a mold 3 which has a cavity 2 formed therein and which can be opened or closed, an opening/closing portion 4 which opens and closes the mold 3, an injector 5 which injects a resin into the mold 3, a temperature adjustor 6 which is capable of adjusting the temperature of the mold 3 to a predetermined temperature, a temperature sensor 7 which measures the temperature of the mold 3, and a controller 8 which controls the opening/closing portion 4, the injector 5 and the temperature adjustor 6 based on the temperature of the temperature sensor 7.

The mold 3 is provided with a fixed mold 11 and a movable mold 12 which are mounted on a movable die plate 15 to be described later and moves in an X direction shown in FIG. 1.

The movable mold 12 is constituted so as to form the cavity 2 having a certain size between the fixed mold 11 and itself when moving in the X direction and in contact with the fixed mold 11. That is, a cavity surface 11a and a cavity surface 12a to which the fixed mold 11 and the movable mold 12 are respectively opposed are faces which form the cavity 2. Further, a temperature-adjusting medium channel 11b and a temperature-adjusting medium channel 12b for flowing a cooling medium and a heating medium (to be described later) for cooling and heating the molds 11, 12 are formed respectively inside the fixed mold 11 and the movable mold 12.

The opening/closing portion 4 is provided with a base 13, a fixed die plate 14 which is fixed to the base 13, a movable die plate 15 which is arranged so as to oppose to the fixed die plate 14 in the X direction, and a mold driving motor 16 as means which is fixed to the base 13 and allows the movable die plate 15 to move in the X direction. Further, at this time, a hydraulic cylinder may be used in place of the mold driving motor 16 as the means for allowing the movable die plate 15 to move in the X direction.

The fixed mold 11 and the movable mold 12 are fixed in such a manner that the cavity surface 11a and the cavity surface 12a are opposed to the fixed die plate 14 and the movable die plate 15, respectively.

The movable die plate 15 is mounted on a guide rail (not illustrated) fixed to the base 13 and able to move accurately in the X direction.

The injector 5 is provided with a unit main body 20 which is connected to the fixed mold 11 and has an injection screw 19 therein, a screw rotating motor (not illustrated) which rotates the injection screw 19 around an axis line in parallel to the X direction, and a screw motor 21 as means for allowing the screw to move in the X direction. A hopper 22 which guides a molding resin material P1 into the unit main body 20 is connected to the unit main body 20. Further, at this time, the screw motor 21 and a screw rotating motor (not illustrated) may be either an electric driving motor or a hydraulic driving motor, and the means which allows the screw to move in the X direction may be a hydraulic cylinder in place of the screw motor 21.

The unit main body 20 is provided with heating means (not illustrated) such as a heater. The material P1 which has been fed into the unit main body 20 is heated by the heating means and also by shear heating of the material P1 resulting from rotation of the screw up to a predetermined temperature higher than the heat distortion temperature of the material P1, plasticized and melted by the injection screw 19 driven by the screw rotating motor (not illustrated). Then, the material P1 is weighed in front of the injection screw 19 after the injection screw 19 is moved backward.

The temperature adjustor 6 is a device for cooling and heating the molds 11, 12 to a predetermined temperature by supplying a cooling medium and a heating medium to the molds 11, 12. The temperature adjustor 6 is provided with a temperature adjusting device (not illustrated) for controlling respectively the temperature of the cooling medium and that of the heating medium constantly and a flow rate adjusting device for switching the type or the temperature of the medium flowing through each of the temperature-adjusting medium channels 11b, 12b and also adjusting the flow rate of the medium.

In the present embodiment, the cavity surface 11a of the fixed mold 11 and the cavity surface 12a of the movable mold 12 are adjusted so as to give a substantially equal temperature. However, it is feasible that within such a difference range in thermal expansion that no adhesive wear will occur at a fitting part between the cavity surface 11a and the cavity surface 12a, the cavity surface 11a and the cavity surface 12a are respectively adjusted to a mutually different temperature in such a manner that, for example, a clearance of the fitting part between the cavity surface 11a and the cavity surface 12a after thermal expansion is 0 (mm) or more.

It is also feasible that the temperature-adjusting medium channels 11b, 12b of the molds 11, 12 are used only for supplying the cooling medium and the molds 11, 12 are heated by an electric heater such as an electric resistance heater or an electromagnetic heater.

The temperature sensor 7 is arranged in the vicinity of the cavity surface 12a of the movable mold 12 and able to measure the temperature of the cavity surface 12a.

The mold driving motor 16, the screw motor 21, the temperature adjustor 6 and the temperature sensor 7 are respectively connected to the controller 8. Then, the controller 8 is able to detect the temperature measured by the temperature sensor 7. Where each of the cavity surface 11a and the cavity surface 12a is adjusted so as to give a mutually different temperature, it is preferable that the temperature sensor 7 is arranged on the cavity surface 12a and a temperature sensor (not illustrated) is also arranged in the vicinity of the cavity surface 11a and a temperature adjustor (not illustrated) is used to control the temperature of the cavity surface 11a so as to give a temperature different from the temperature of the cavity surface 12a. Further, the temperature sensor to be arranged on each of the cavity surfaces may be arranged not at a single site but at a plurality of sites.

Next, a description will be given of the injection molding method (molded-article producing method) of the present embodiment in which the above-constituted injection molding apparatus 1 is used. The injection molding method is a method in which there are repeated alternately a heating step for increasing a temperature of the cavity surface 12a of the movable mold 12 to a temperature equal to or higher than a heat distortion temperature of the resin material P1 and an injection step for injecting a melted resin material P1 into the cavity 2 during a decrease in temperature of the cavity surface 12a.

Figure 2:
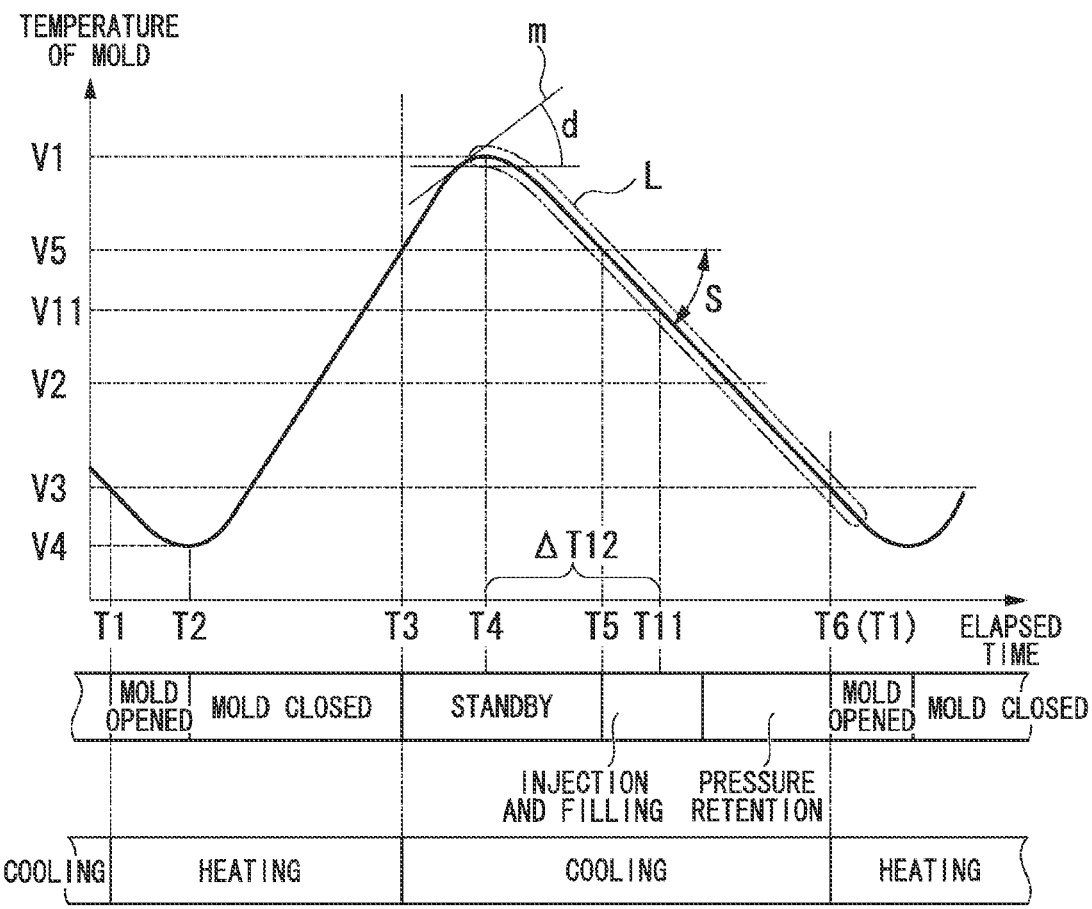
FIG. 2 is a drawing which describes injection molding motions as well as temperature control and temperature change of a mold in an injection molding method using the same injection molding apparatus.
Figure 4:
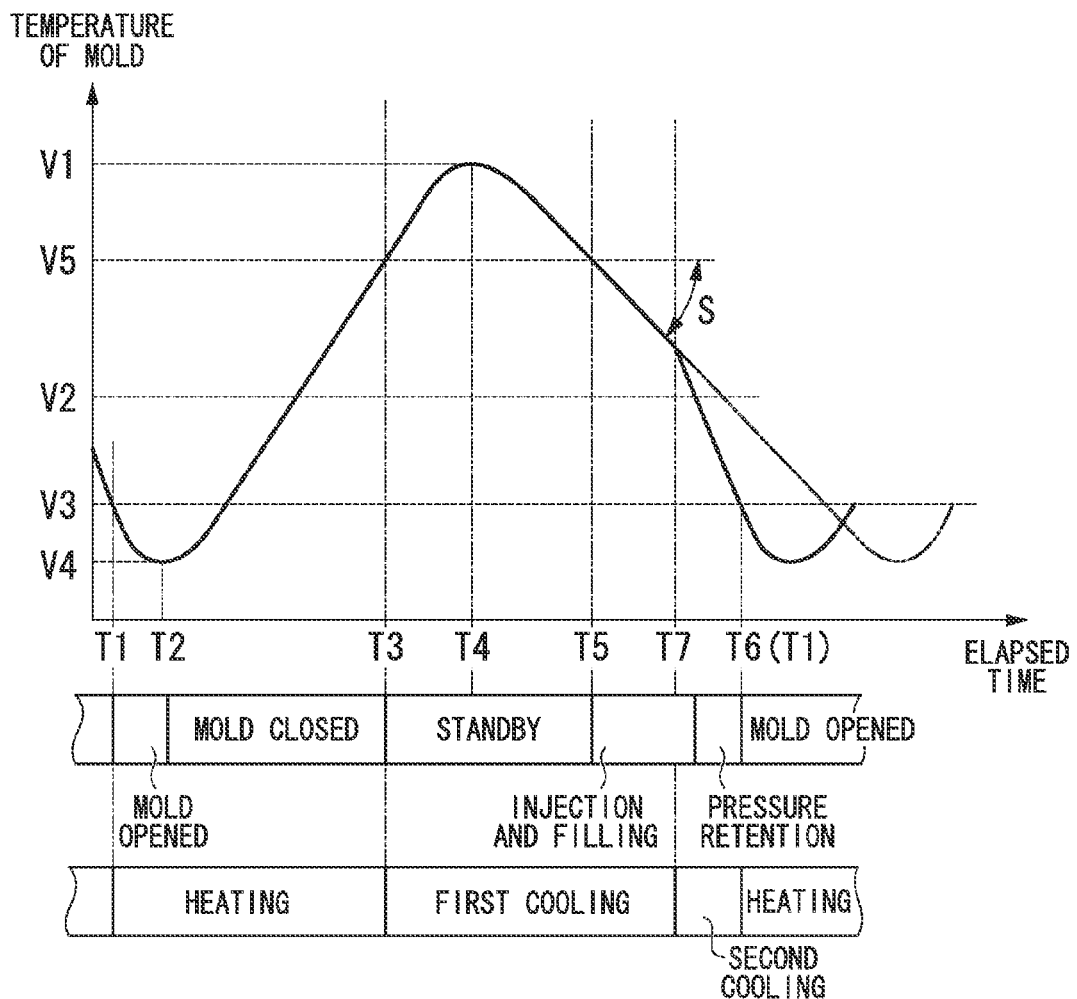
FIG. 4 is a drawing which describes injection molding motions as well as temperature control and temperature change of a mold in a modified example of the injection molding method using the same injection molding apparatus.

FIG. 2 and FIG. 4 given below are graphs, each of which shows a change in temperature of the cavity surface 12a of the movable mold 12 corresponding to elapsed time. The horizontal axis of each of the graphs indicates elapsed time, while the vertical axis indicates the temperature of the cavity surface 12a of the movable mold 12 measured by the temperature sensor 7.

As shown in FIG. 2, a cooling target temperature V3 for cooling the cavity surface 12a of the movable mold 12 is set at a temperature sufficiently lower than a heat distortion temperature V2 (for example, a temperature lower than the heat distortion temperature V2 by about several tens of degrees). Further, a heating target temperature V5 for heating the cavity surface 12a is also set at a temperature sufficiently higher than the heat distortion temperature V2 (for example, a temperature higher than the heat distortion temperature V2 by about several tens of degrees).

In the present embodiment, a temperature difference between the heat distortion temperature V2 and the cooling target temperature V3 and a temperature difference between the heat distortion temperature V2 and the heating target temperature V5 are by several tens of degrees, respectively. The difference in temperature can be, however, set at any given value of 0 (° C.) or higher, depending on the physical properties, and so on, of a resin used in injection molding.

The controller 8 carries out the heating step at the time T1 when a temperature on the cavity surface 12a of the movable mold 12 cooled by the temperature adjustor 6 is detected to have become the cooling target temperature V3, which will be described as follows.

First, the temperature adjustor 6 is used to switch a cooling medium which is a medium that flows through the temperature-adjusting medium channels 11b, 12b to a heating medium, and the mold driving motor 16 is used to move the movable mold 12 in the X direction, that is, in a direction spacing away from the fixed mold 11, thereby opening the mold 3. At this time or thereafter, when the cooling medium is switched to the heating medium, during a period from the stop of supplying the cooling medium to the start of supplying the heating medium, there may be provided a standby time or time for discharging the cooling medium using compressed air or the like. Then, a molded article which has been already been molded inside the cavity 2 is ejected using an ejector (not illustrated) and removed from the mold. Further, the mold driving motor 16 is used to move the movable mold 12 to the fixed mold 11 side, thereby closing the mold 3.

Immediately after the start of heating of the molds 11, 12, the molds 11, 12 are continuously reduced in temperature due to thermal inertia, and so on, of the molds 11, 12 and reach a lowest temperature V4 at the time T2. However, the molds are, thereafter, raised in temperature.

Then, at the time T3, when the temperature of the cavity surface 12a of the movable mold 12 is detected to have become the heating target temperature V5, the controller 8 carries out the injection step next to the heating step.

Subsequently, in the injection step, the controller 8 uses the temperature adjustor 6, thereby stopping the supply of the heating medium which is a medium flowing through the temperature-adjusting medium channels 11b, 12b. The heating medium may be switched to the cooling medium at the same time when the temperature of the cavity surface 12a is detected to have become the heating target temperature V5, or before the temperature of the cavity surface 12a becomes the heating target temperature V5 and when the temperature of the cavity is detected to have reached a temperature lower than the heating target temperature V5 by a predetermined degree. Further, the heating medium may be switched to the cooling medium after a delay in the predetermined time from the timing when the temperature of the cavity surface 12a is detected to have become the heating target temperature V5 or after the heating medium using compressed air or the like is discharged. The molds 11, 12 continue to increase in temperature in excess of the heating target temperature V5 after an elapse of the time T3 due to thermal inertia, and so on, of the molds 11, 12 (overshooting). The molds gradually decrease in temperature rising speed between the time T3 and the time T4, (a temperature rising gradient d formed between a tangent line m of a temperature change curve of the molds and the horizontal axis decreases) and become the highest temperature V1 at the time T4. Thereafter, there is found a decrease in the temperature of the molds 11, 12.

Figure 3:
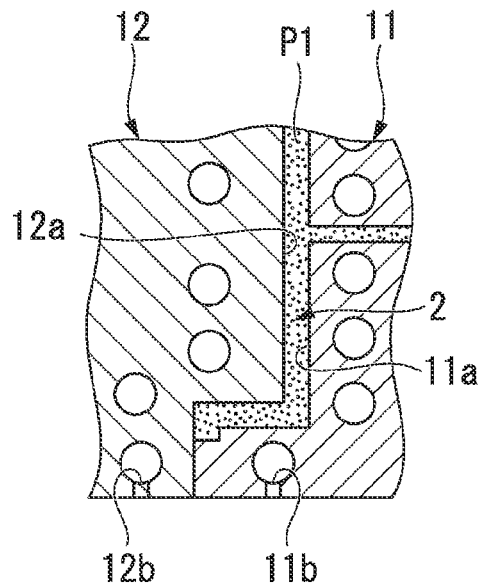
FIG. 3 is a sectional view of major parts of the same injection molding apparatus which shows a state in which a resin is filled into a cavity of the mold thereof.

Then, during a decrease in temperature, when the temperature of the cavity surface 12a is detected to have become the heating target temperature V5 at the time T5, the controller 8 allows the screw motor 21 to move (advance) the injection screw 19 toward the fixed mold 11 in the X direction, thereby injecting a predetermined amount of the melted material P1 into the cavity 2. Then, as shown in FIG. 3, the material P1 is filled into the cavity 2 in such a manner that the resin material P1 is brought into contact with the cavity surfaces 11a, 12a of the molds 11, 12. Whether the resin material P1 is partially or entirely in contact with the cavity surfaces 11a, 12a is judged by detecting that the resin injected from the injector 5 has reached a predetermined amount, that is, that the movement amount of the screw (advanced amount) has reached a predetermined value. This is also judged by detecting that a pressure of the resin during injection has reached a predetermined pressure value.

After completion of filling a predetermined amount of the material P1 into the cavity 2, the controller 8 carries out the pressure retaining step at which the pressure of the resin inside the cavity 2 is kept at a higher pressure for a certain period of time by using the screw motor 21.

At this time, the molds 11, 12 are decreased in temperature with the elapse of time. Additionally, as shown in FIG. 2, when the temperature of the cavity surface 12a is detected to have become the cooling target temperature V3 at the time T6, the controller 8 carries out the heating step next to the injection step and repeats the steps shown in the above heating step. Further, the injection step may be shifted to the heating step at the same time when the temperature of the cavity surface 12a is detected to have become the cooling target temperature V3, or before the temperature of the cavity surface 12a becomes the cooling target temperature V3 and when this temperature is detected to have reached a temperature lower than the cooling target temperature V3 by a predetermined amount. Still further, the above shifting may be done after a delay of a predetermined time from the timing when the temperature of the cavity surface 12a is detected to have become the cooling target temperature V3 or after the cooling medium using compressed air or the like is discharged. As described above, the heating step and the injection step are alternately repeated to produce molded articles continuously.

In a conventional injection molding method, for example, as shown in FIG. 2, a resin is injected into a cavity at the time T3 when the temperature of a cavity surface of a movable mold rises and becomes the heating target temperature V5. Therefore, in the present embodiment, the timing of the injection is delayed by a time difference between the time T5 and the time T3, as compared with the conventional injection molding method.

However, in the injection molding method of the present embodiment and in the conventional injection molding method, there is no difference in the total amount of heat necessary for cooling and removing a heated mold and a melted resin in one molding cycle, in the heating time, and in the timing of start of cooling. Therefore, regardless of the timing of the injection, there is no change in temperature profile of the cavity surface (heating speed and time, as well as cooling speed and time). Thus, the time necessary for carrying out the method of the present embodiment in one molding cycle is substantially equal to the time necessary for carrying out the conventional method.

Further, even where the mold increases in temperature depending on the amount of heat generated from shear heating of a resin during injection, injection is carried out during cooling. For this reason, the highest temperature after the mold has risen in temperature by the shear heating is effective in shortening cooling time, because the highest temperature of the mold and that of the resin during injection during cooling according to the present invention can be made lower than the highest temperature of the mold and that of the resin on during conventional injection during overshooting greater in temperature rising speed gradient at a still rising temperature of the mold.

As so far described, according to the injection molding apparatus 1 and the injection molding method of the present embodiment, in the injection step, during a decrease in temperature of the cavity surface 12a of the mold 12, the resin material P1 is injected into the cavity 2. Thereby, as compared with a conventional case where the resin is injected in a state where the temperature of the cavity surface is largely in excess of the lowest temperature lower limit at which high transfer properties can be obtained by overshooting, the resin is kept for a shorter period of time in a high-temperature region where the temperature of the resin is equal to or higher than the heat distortion temperature V2, and the resin contraction advances. Thus it is possible to suppress the formation of sink marks on a molded article.

Further, during a decrease in temperature of the cavity surface 12a, the melted resin material P1 is injected into the cavity 2. Therefore, the injected material P1 is influenced by temperatures of the cavity surfaces 11a, 12a, and the resin is decreased in temperature at an earlier stage than the conventional case where the temperature of the cavity surface is largely in excess of the lowest temperature where the high transfer properties can be obtained by overshooting. Therefore, the resin in contact with the cavity surfaces 11a, 12a is further reduced in temperature to increase the viscosity of the resin, thus making it possible to reduced the formation of burrs on a molded article. Still further, since the resin is decreased in temperature at an earlier stage, heat deterioration such as thermal decomposition and changes in color, and hydrolysis of such resins that are liable to hydrolysis and poor in heat stability can be suppressed.

In addition, the temperature of the resin which is melted at a temperature equal to or higher than the heat distortion temperature V2 and in contact with the cavity surface 12a to become the heating target temperature V5 is a temperature equal to or higher than the heat distortion temperature V2. Therefore, the resin which maintained fluidity is brought into contact with the cavity surface 12a of the movable mold 12, thus making it possible to reliably transfer a configuration of the cavity surface 12a to the resin.

Conventionally, there is a case that a melted resin is injected into a cavity at the time when a temperature on a cavity surface of a mold rises to become the heating target temperature. Then, during a rise in the temperature of the mold, the temperature of the mold which is controlled so as to give a predetermined temperature may temporarily exceed the predetermined temperature and undergo overshooting. Therefore, the injected resin is in contact with the surface of the cavity of the mold, the temperature of which is brought closer to a resin melting temperature. Thus, the resin which is in contact with the surface of the cavity is decreased in temperature to a small extent. A lesser amount of decrease in resin temperature may allow the resin to enter into a space between the molds to form burrs on a molded article because the resin maintains a highly fluid state which is low in viscosity.

In contrast, in the injection molding method of the present embodiment, during a decrease in temperature of the cavity surface 12a, the resin is injected into the cavity 2. Thereby, the resin in contact with the cavity surface is kept at a temperature equal to or higher than the heat distortion temperature to decrease the period of time during which the resin is in a highly fluid state. It is, thus, possible to prevent the formation of burrs on a molded article.

Further, in the injection step, temperatures of the cavity surfaces 11a, 12a when the resin material P1 is in contact entirely with the cavity surfaces 11a, 12a of the molds 11, 12 are equal to or higher than the heat distortion temperature V2 of the material P1. Therefore, the temperature immediately after the melted resin in contact with the cavity surfaces 11a, 12a is a temperature equal to or higher than the heat distortion temperature V2. It is, thus, possible to reliably transfer configurations of the entire cavity surfaces 11a, 12a to the resin by bringing the fluidity-maintained resin into contact with the cavity surfaces 11a, 12a of the molds 11, 12.

In the above-described injection molding method, as will be described hereinafter, the temperature of the cavity surface 12a of the movable mold 12 may be controlled in various ways.

For example, as shown in FIG. 4, in the injection step, after the time T7 when the resin material P1 is in contact with the entire cavity surfaces 11a, 12a of the molds 11, 12, the temperature adjustor 6 may be used to increase the cooling speed of the cavity surfaces 11a, 12a. That is, in this instance, the controller 8 allows the temperature adjustor 6 to increase the flow rate of the cooling medium supplied to the temperature-adjusting medium channels 11b, 12b of the molds 11, 12 more in a second cooling step from the time T7 to the time T6 than in a first cooling step from the time T3 to the time T7 or the like. Thereby, the cavity surfaces 11a, 12a are increased in cooling speed more in the second cooling step than in the first cooling step.

Control is carried out in the manner described above, by which it is possible to reliably transfer the configurations of the entire cavity surfaces 11a, 12a to the resin and also shorten the time necessary to produce a molded article (from the time T1 to the time T6).

Further, in the present embodiment, during a decrease in temperature of the cavity surface 12a, when the temperature on the cavity surface 12a has become the heating target temperature V5, the melted material P1 is injected into the cavity 2. However, during a decrease in temperature of the cavity surface 12a, there is no restriction on time when the resin is injected into the cavity 2. For example, by confirming a finishing state of a molded article, injection is set at any given time from the time T4 at which the highest temperature V1 is obtained to the time T2 at which the lowest temperature V4 is obtained. It is, thereby, possible to adjust burrs, warping, and so on, of the molded article, whenever necessary.

Still further, it is feasible that the temperature sensor 7 is used to measure the temperature of the cavity surface 12a so as to correspond to the elapsed time, a control device is used to calculate a temperature rising gradient value, that is, a value of temperature rising gradient d of the cavity surface 12a with respect to time, and when the temperature rising gradient has become a value equal to or lower than a predetermined gradient value, rise in temperature of the cavity surface 12a is judged to become a saturated state, thereby starting the injection. In order to reliably obtain the effects of the present invention, it is necessary to start the injection after the temperature on the cavity surface 12a starts to decrease. However, in a case such as a mold specification is to be small in overshooting and even if the injection is started in a state that the cavity surface 12a is sufficiently low in temperature rising degree, it is possible to practically prevent burrs and sink marks on a molded article. That is, when the temperature rising gradient of the cavity surface 12a has become a value equal to or lower than a predetermined gradient value, the highest temperature V1 is deemed to have been detected. It is, thereby, possible to shorten the time necessary to produce a molded article (cycle time or tact time).

Second Embodiment

Next, a description will be given of the second embodiment of the present invention. The same members as those of the first embodiment will be given the same reference numerals, and a description thereof is omitted here. Only members different from those in the previous embodiment will be described.

Figure 5:
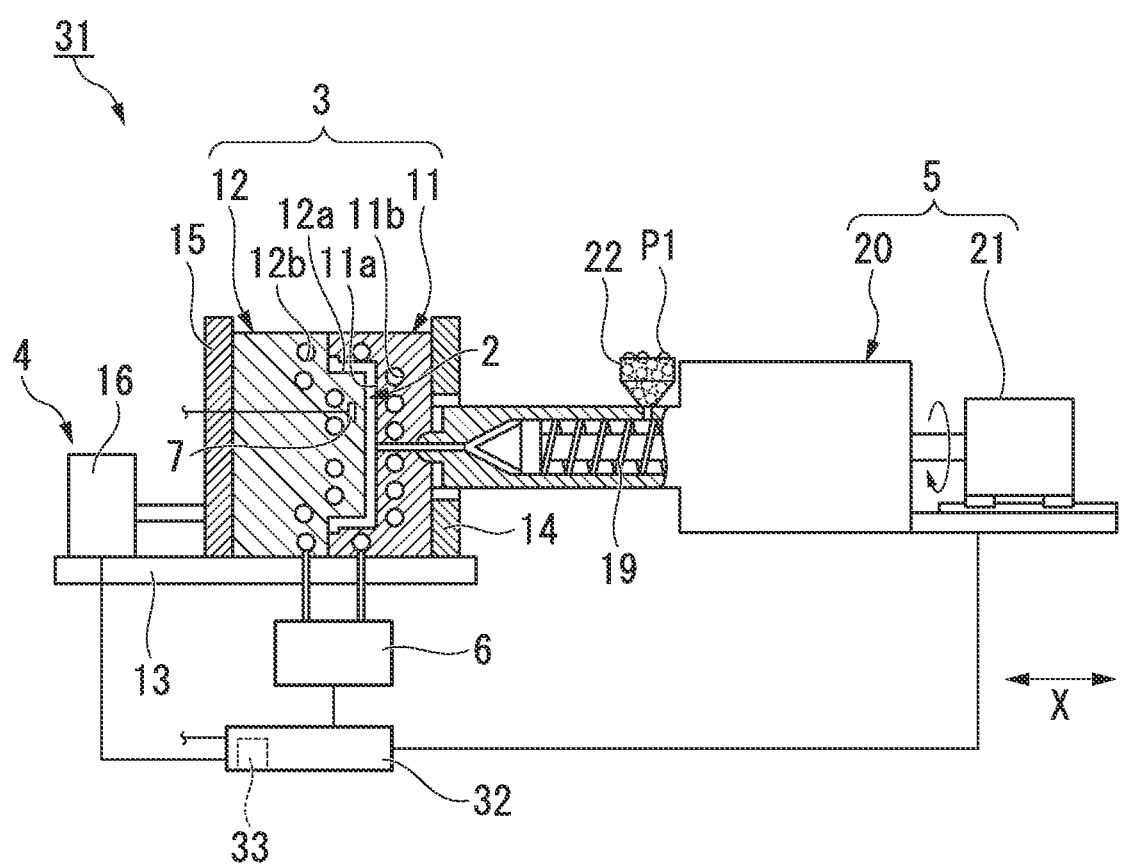
FIG. 5 is a partially broken side view which shows an injection molding apparatus of a second embodiment of the present invention.

As shown in FIG. 5, a controller 32 of an injection molding apparatus 31 of the present embodiment is provided with a timer 33 for measuring a predetermined time, in addition to the same constitution as the controller 8 of the first embodiment.

The timer 33 counts down an instructed time from the time of receiving a signal and subsequently sends a signal for notifying the controller 32 after an elapse of the time.

In the following, a description will be given of a case where the injection molding apparatus 31 moves in accordance with the injection molding motions and the temperature control of a mold as shown in FIG. 2.

In the injection molding apparatus 31, a heating step and an injection step are repeated stably. Thus, after molds 11, 12 are heated in the heating step, and in the injection step, the molds 11, 12 are stably decreased in temperature, indicating a certain tendency with respect to the elapsed time from the time T4 when the molds 11, 12 start to decrease in temperature. That is, when molding is carried out by the injection molding apparatus 31, a relational expression of the temperature of the cavity surface 12a of the movable mold 12 with respect to a period of time from the time T4 to the time T6 shown in FIG. 2 is provided on a constant curve L.

Thus, for example, a preliminary test is in advance carried out by the above-described injection molding apparatus 31 or a molded article is produced on a trial basis. Thereby, a relational expression as shown by the curve L is determined on change in temperature of the cavity surface 12a with respect to the elapsed time, and this relational expression is stored at the controller 32.

Next, a description will be given of an injection molding method of the present embodiment in which the above-constituted injection molding apparatus 31 is used.

A user sets a temperature V11 at any desired value at which a resin is injected into a cavity 2, inputting the value from input means (not illustrated) to the controller 32.

As shown in FIG. 2, the controller 32 determines the time T11 from the relational expression of the stored curve L and the temperature V11 and also determines time ΔT12 from the time T4 to the time T11.

Upon receiving instructions for operating the injection molding apparatus 31, the controller 32 starts the heating step at the time T1. Motions of the injection molding apparatus 31 after the start of the heating step are the same as those of the injection molding method in which the injection molding apparatus 1 is used and they are different only in a method by which the controller 32 detects a timing for injecting a material P1 into the cavity 2.

That is, in the present embodiment, when the controller 32 detects at the time T4 that the temperature of the cavity surface 12a of the movable mold 12 has become the highest temperature V1, the controller 32 sends to the timer 33 a signal corresponding to the time ΔT12 to be measured and a signal for starting the measurement. Upon receiving the signals, the timer 33 measures time elapsed from the time T4 and sends a signal to the controller 32 at the time T11 when the time ΔT12 has elapsed from the time T4.

When the timer 33 detects elapse of the time ΔT12 from the time T4, the controller 32 allows the injector 5 to inject the melted resin material P1 into the cavity 2.

As so far described, according to the injection molding apparatus 31 and the injection molding method of the present embodiment, it is possible to suppress the formation of sink marks and burrs on a molded article as with the injection molding apparatus 1.

Further, a timing when the resin is injected by the injector 5 can be detected not by referring to the temperature measured by the temperature sensor 7 but by referring to the time measured by the timer 33. It is, thus, possible to increase the number of methods for adjusting the injection timing of the injection molding apparatus 31.

Still further, for example, where any change in ambient temperature around the injection molding apparatus 31, and so on, results in a change in the relational expression on change in temperature of the cavity surface 12a with respect to elapsed time in the injection step, the relational expression may be again determined and stored in the controller 32. Accordingly, it is possible to improve the accuracy of the temperature at which injection is carried out.

In addition, a resin is injected by the injector 5 at a timing when the temperature of the cavity surface 12a of the movable mold 12 meets predetermined conditions and the time measured by the timer 33 also meets predetermined conditions. Thereby, it is possible to make the timing of resin injection more stable.

Alternatively, during heating of the mold, the timer 33 is provided as a timer which will start at a timing when the temperature of the temperature sensor 7 has reached a predetermined temperature, and injection may be started when time is up by the timer 33.

During the heating, the mold is greater in temperature rising speed (a greater temperature rising tendency with respect to time). Thus, even where the temperature sensor is low in detection accuracy, the sensor is able to detect without delay a timing when the temperature of the mold has reached a predetermined temperature, making it possible to prevent the mold from being unnecessarily heated. Temperature overshooting can be completed at an earlier stage to shorten the time necessary for producing a molded article.

Alternatively, the timer 33 is provided as a timer which will start from the start of heating of the mold or as a timer which will start at the time when heating is completed on detection that the temperature of the mold has reached a predetermined heating target temperature, and so on, and the injection may be started when time is up by the timer 33.

The temperature of the mold will start to decrease after heating of the mold is completed. Therefore, in a case where the heating of the mold is completed when time is up by the timer 33 which will start after the start of heating, and so on, as criteria for a timing of heating completion, the injection is started at a delay, thus making it possible to reliably inject the resin after heating completion of the mold. In particular, for a heated mold which is not provided with the temperature sensor 7, it is possible to figure out the timing when the temperature of the mold starts to decrease. More specifically, a temperature sensor temporarily installed in a preliminary test is used to measure the temperature of the mold during heating of the mold, or a temperature rising analysis of heating of the mold is made to figure out the time when the temperature of the mold starts to decrease. Thereby, even a mold which is not provided with a temperature sensor is able to carry out injection when the temperature of the mold has reached the highest temperature or after the temperature of the mold starts to decrease.

Alternatively, the temperature sensor 7 which corresponds to elapsed time is used to measure the temperature of the cavity surface 12a, and a control device is used to calculate a temperature rising gradient value of the cavity surface 12a with respect to time. Then, as the timer 33, there is provided a timer which will start when the temperature rising gradient value is equal to or lower than a predetermined gradient value. Rise in temperature on the cavity surface 12a is judged to be in a saturated state by referring to that the time is up by the timer 33 and, then, injection may be started.

Where a temperature measured by the temperature sensor 7 is contaminated by noise, it will vary vertically, despite no vertical variation of actual temperatures of the cavity. Thus, in particular, at a period of time when the temperature of the cavity surface 12a is a temperature close to the highest temperature varies to a minimum extent, there may develop such a state that it may be impossible to judge whether the temperature of the cavity surface 12a has begun to decrease or not. However, if the injection is started when time is up by the timer which will start when the temperature rising gradient value of the cavity surface 12a becomes equal to or lower than a predetermined gradient value, it is possible to ignore a disturbance such as noise close to the highest temperature V1. Therefore, the start of injection can be carried out stably at the time when the temperature rise of the cavity surface 12a has passed through a saturated state and the temperature is estimated to be decreasing. That is, such time that the temperature rising gradient value of the cavity surface 12a is equal to or lower than a predetermined gradient value is deemed to have been detected, and therefore, it is possible to produce a molded article stably by removing influences resulting from the disturbance.

A description has been so far made in detail for the first embodiment and the second embodiment of the present invention with reference to the drawings. A specific constitution is not limited to these embodiments, and the present invention shall include any change, and so on, in constitution within a scope not departing from the gist of the present invention.

For example, in the first embodiment and the second embodiment, the cooling speed of the cavity surface 12a of the movable mold 12 (the cooling speed s which indicates a tendency with respect to time of the temperature of the mold in FIG. 2 and FIG. 4) may be set to 1.0 (° C./s) or higher in the injection step.

Control is carried out in the manner described above, thus making it possible to shorten the time during which a resin having a higher temperature than the heat distortion temperature V2 is in contact with the cavity surface 12a. Then, it is possible to prevent the resin from attaching firmly to the cavity surface 12a by an anchor effect, and so on, resulting from the resin which enters into micro recesses on the surface of the cavity. Whether the resin firmly attaches on the cavity surface or not is determined by conditions of local temperature, pressure, and so on, between the resin and the cavity surface. This is not dependent on the thickness or configuration of the mold on which the cavity surface is formed. The inventors have diligently conducted tests, finding that the cooling speed s is set at 1.0 (° C./s) or higher to shorten the above contact time, thus making it possible to prevent the resin from attaching firmly to the cavity surface.

Further, in the first embodiment and the second embodiment, the temperature of the cavity surface 12a of the movable mold 12 was measured by using one temperature sensor 7. However, it is feasible that the temperature of the cavity surface 12a is measured by a plurality of temperature sensors, and, among any temperatures measured by any one of the plurality of temperature sensors, or a limited number of temperature sensors selected from the plurality of temperature sensors or all the plurality of temperature sensors, after any of the temperatures starts to decrease due to heat release or cooling effects, or after the average value of any temperatures measured by a limited number of temperature sensors selected from the plurality of temperature sensors or all the plurality of temperature sensors starts to decrease due to heat release or cooling effects, the injection step is started. It is feasible that when a temperature measured by any one of the plurality of temperature sensors, a limited number of temperature sensors selected from the plurality of temperature sensors, or all of the plurality of temperature sensors is equal to or lower than the cooling target temperature V3, or among any temperatures measured by a limited number of temperature sensors selected from the plurality of temperature sensors or all the plurality of temperature sensors, when an average value of any temperatures is equal to or lower than the cooling target temperature V3, the heating step is started. It is also feasible that when a temperature measured by any one of the plurality of temperature sensors, or a limited number of temperature sensors selected from the plurality of temperature sensors or all the plurality of temperature sensors, is equal to or higher than the heating target temperature V5, or when an average value of any temperatures measured by a limited number of temperature sensors selected from the plurality of temperature sensors or all the plurality of temperature sensors is equal to or higher than the heating target temperature V5, the cooling step is started.

Still further, in the first embodiment and the second embodiment, the temperature of the cavity surface 12a of the movable mold 12 is measured by one temperature sensor 7. However, the temperature sensor 7 may conduct the above-described behavior on the basis of a measurement result of the temperature of the cavity surface 11a of the fixed mold 11. The temperature sensor 7 may also conduct the above-described behavior on the basis of measurement results of the temperatures on both the cavity surface 12a of the movable mold 12 and the cavity surface 11a of the fixed mold 11.

Control is carried out in the manner described above. Thereby, even where the temperatures of the cavity surfaces 11a, 12a vary largely depending on the position of measurement, there can be an increased in the degree of freedom of set molding conditions under which the configuration of the cavity surface of the mold can be reliably transferred to the resin and a molded article can be also reliably cooled, thus improving the moldability.

Example

Figure 6:
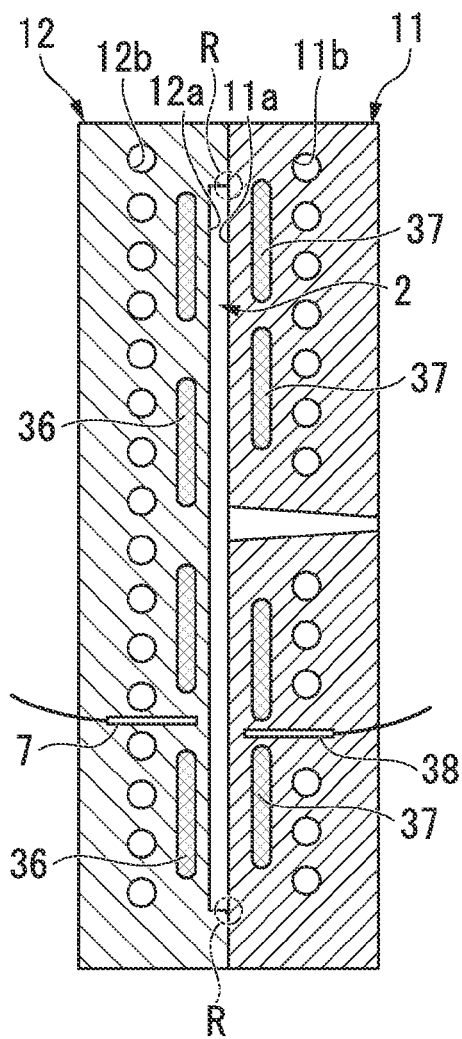
FIG. 6 is a sectional view which shows major parts of a mold used in an example.

Next, a description will be given of results of a resin molding test using the injection molding apparatus 1 of the first embodiment. FIG. 6 shows molds 11, 12 used in this example.

In the vicinity of the cavity surface 12a of the movable mold 12, there are arranged a heater 36 for heating the cavity surface 12a and the above-described temperature sensor 7 for measuring the temperature of the cavity surface 12a. Similarly, in the vicinity of the cavity surface 11a of the fixed mold 11, there are arranged a heater 37 for heating the cavity surface 11a and a temperature sensor 38 for measuring the temperature of the cavity surface 11a.

As the injector 5, an injection molding machine 450MEII-50U (manufactured by Mitsubishi Heavy Industries Plastic Technology Co., Ltd.) was used. As the injection screw 19, a screw which is for a resin containing a long fiber and has an outer diameter of φ70 mm was used.

The used resin is a polypropylene resin containing 30% long glass fiber (made by Daicel Polymer Ltd.). The polypropylene resin which is a matrix component of this resin has a distortion temperature of 60 (° C.) (load: 1.82 MPa). The resin which contains the glass fiber has a distortion temperature of 145° C. (load: 1.82 MPa).

Water was used as the cooling medium of the temperature adjustor 6.

Figure 7:
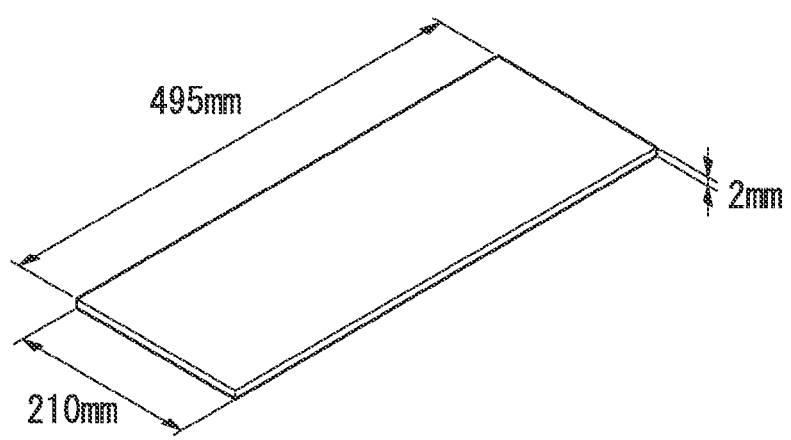
FIG. 7 is a drawing which shows a configuration of a molded article formed in the example.

After the molds 11, 12 were heated constantly up to the heating target temperature V5, the injector 5 was used to inject the resin heated at 250° C. with an injection pressure of 60 (MPa) into the cavity 2 between the molds 11, 12 where the temperature was raised above the heating target temperature V5 and then lowered back to the heating target temperature V5. Thereafter, the resin was retained at a retaining pressure of 53 (MPa), and the molds 11, 12 were cooled at a constant cooling speed s. The prepared molded article was a flat plate for test use, and the configuration is shown in FIG. 7. The molded article weighed 225 g.

Table 1 shows an formation status of burrs on the molded article found when the heating target temperature V5 was changed from 100, 150, to 200 (° C.) and the cooling speed s was changed from 0.5, 0.7, 1.0 to 5.0 (° C./s). Parts where the burrs form on the molded article are parts R at which the fixed mold 11 is mutually in contact with the movable mold 12 shown in FIG. 6.

TABLE 1

| Cooling speed | Heating target temperature (° C.) | | |
|---|---|---|---|
| (° C./s) | 100 | 150 | 200 |
| 0.5 | B | C | C |
| 0.7 | A | B | C |
| 1.0 | A | A | A |
| 5.0 | A | A | A |

Among combinations of the heating target temperatures V5 with the cooling temperatures s shown in Table 1, when the combinations recorded with the sign A were used to carry out molding, no burr occurred on the molded article. When the combinations recorded with the sign B were used to carry out molding, a very small burr occurred on the molded article. When the combinations recorded with the sign C were used to carry out molding, small burrs are formed on the molded article. Here, when the burr projecting from a reference surface is 0.2 mm or higher in height, a small burr is determined to be present. When the burr projecting from the reference surface is lower than 0.2 mm in height, it is determined that a very small burr is present.

Further, in this example, under any molding condition that the heating target temperatures V5 and the cooling speeds s were changed, it was confirmed that formation of burrs on the molded article was suppressed as compared with a conventional case where the injection was carried out when the temperature of the cavity surface was a constant temperature.

The overshot temperatures when the heating target temperatures V5 were 100, 150, and 200 (° C.) were respectively about 110, 156, and 204 (° C.).

As apparent from test results shown in Table 1, when the cooling speed 1 is 1.0 (° C./s) or higher, it was found that no burr was present on the molded article at any of the heating target temperatures V5, that is, 100, 150, and 200 (° C.).

Further, when the cooling speed s is equal to or lower than 0.7 (° C./s), a burr is determined to be present. However, it was found that when the heating target temperature V5 was higher (200(° C.)), the burr was greater in height (the greater the tendency to become C).

Although no test results were shown, where the heating target temperature V5 was constant, it was confirmed that no change in formation of burrs on the molded article occurred, even if the resin is injected at any time when the cavity surface 12a of the mold 12 is decreased in temperature.

INDUSTRIAL APPLICABILITY

The present invention is an injection molding method for injecting a resin into a cavity formed within a mold. This method relates to an injection molding method which is provided with a heating step in which a temperature of a cavity surface which forms the cavity of the mold is heated to a temperature equal to or higher than the heat distortion temperature of the resin and an injection step in which after the heating step, during a decrease in temperature of the cavity surface of the mold, the resin is injected into the cavity. According to the present invention, it is possible to suppress the occurrence of sink marks and burrs on a molded article.

DESCRIPTION OF REFERENCE NUMERALS 1, 31: Injection molding apparatus
2: Cavity
3: Mold
5: Injector
6: Temperature adjustor
7: Temperature sensor
8, 32: Controller
11a, 12a: Cavity surface
33: Timer
V2: Heat distortion temperature

The invention claimed is:

1. An injection molding method for injecting a resin into a cavity formed within a mold,
the injection molding method comprising:
a heating step for heating a temperature of a cavity surface which forms the cavity of the mold to a temperature equal to or higher than a heat distortion temperature of the resin; and
an injection step for injecting the resin into the cavity during a decrease in temperature of the cavity surface of the mold after the heating step, wherein
the temperature of the cavity surface of the mold is measured corresponding to elapsed time, thereby calculating a temperature rising gradient value of the cavity surface with respect to the time, and when the temperature rising gradient value is equal to or lower than a predetermined value or when time is up by a timer set to start at the time when the temperature rising gradient value is equal to or lower than the predetermined value, injection is started.

2. The injection molding method according to claim 1, wherein,
in the injection step, the resin is injected into the cavity when the temperature of the cavity surface of the mold reaches a predetermined temperature equal to or higher than the heat distortion temperature of the resin.

3. The injection molding method according to claim 1, wherein
in the injection step, the temperature of the cavity surface at the time when the resin is in contact with the entire cavity surface of the mold is set so as to be equal to or higher than the heat distortion temperature of the resin.

4. The injection molding method according to claim 1, wherein the resin is a resin which contains a filler, and the heat distortion temperature is a heat distortion temperature of the resin which is a matrix component of the resin which contains the filler.

5. The injection molding method according to claim 3, wherein
in the injection step, after the resin is in contact with the entire cavity surface of the mold, the cooling speed of the cavity surface is increased.

6. The injection molding method according to claim 1, wherein
in the injection step, the cooling speed of the cavity surface of the mold is set at 1.0 (° C./s) or higher.

7. The injection molding method according to claim 1, wherein
the temperature of the cavity of the mold is measured at a plurality of sites, after the heating step, and, for any one of temperature measurement values at the plurality of sites, or a limited number of all the temperature measurement values selected from the temperature measurement values at the plurality of sites, or for all the temperature measurement values at the plurality of sites, and after any of the temperature measurement values starts to decrease, the resin is injected into the cavity.

8. The injection molding method according to claim 1, wherein
the temperature of the cavity of the mold is measured at a plurality of sites after the heating step, and, for a limited number of all the temperature measurement values selected from the temperature measurement values at the plurality of sites, or for all the temperature measurement values at the plurality of sites, and after any of average values thereof starts to decrease, the resin is injected into the cavity.

9. A molded-article producing method for injecting a resin into a cavity formed within a mold to produce a molded article,
the molded-article producing method comprising:
a heating step in which a temperature of a cavity surface which forms the cavity of the mold is heated to a temperature equal to or higher than a heat distortion temperature of the resin; and
an injection step in which, after the heating step, during a decrease in temperature of the cavity surface of the mold, the resin is injected into the cavity, wherein
the temperature of the cavity surface of the mold is measured corresponding to elapsed time, thereby calculating a temperature rising gradient value of the cavity surface with respect to the time, and when the temperature rising gradient value is equal to or lower than a predetermined value or when time is up by a timer set to start at the time when the temperature rising gradient value is equal to or lower than the predetermined value, injection is started.

10. An injection molding apparatus comprising:
a mold which has a cavity formed therein and which can be opened and closed;
an injector which injects a resin into the mold;
a temperature adjustor which is able to adjust the mold to a predetermined temperature;
a temperature sensor which measures a temperature of a cavity surface that forms the cavity of the mold; and
a controller which has a timer for measuring a predetermined time and controls the injector and the temperature adjustor on the basis of the temperature of the temperature sensor; wherein in the controller, the temperature adjustor is used to heat the mold so that the temperature of the temperature sensor is equal to or higher than the heat distortion temperature of the resin, and after heating of the mold is completed, the injector is used to inject the resin into the cavity, when the temperature sensor detected that the mold started to decrease in temperature or the timer detected the elapse of a predetermined time from the start of a decrease in temperature of the temperature sensor.

* * * * *